US011912144B2

(12) United States Patent
Wheatley

(10) Patent No.: US 11,912,144 B2
(45) Date of Patent: *Feb. 27, 2024

(54) SELF-CONTAINED RENEWABLE INDUCTIVE BATTERY CHARGER

(71) Applicant: BEAM GLOBAL, San Diego, CA (US)

(72) Inventor: Desmond Wheatley, Rancho Santa Fe, CA (US)

(73) Assignee: Beam Global, San Diego, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 16/719,634

(22) Filed: Dec. 18, 2019

(65) Prior Publication Data

US 2021/0188105 A1 Jun. 24, 2021

(51) Int. Cl.
*H02J 7/00* (2006.01)
*H02J 7/14* (2006.01)
*B60L 53/122* (2019.01)
*B60L 53/52* (2019.01)
*B60L 53/53* (2019.01)
*B60L 53/51* (2019.01)
*H02S 20/32* (2014.01)

(52) U.S. Cl.
CPC .............. *B60L 53/122* (2019.02); *B60L 53/51* (2019.02); *B60L 53/52* (2019.02); *B60L 53/53* (2019.02); *H02S 20/32* (2014.12)

(58) Field of Classification Search
CPC ........ B60L 53/122; B60L 53/51; B60L 53/53; B60L 53/52; H02S 20/32
USPC .................................................. 320/109, 104
See application file for complete search history.

(56) References Cited

U.S. PATENT DOCUMENTS

| 4,418,684 A | 12/1983 | Sanders |
| 5,315,227 A | 5/1994 | Pierson |
| 7,705,277 B2 | 4/2010 | Noble |
| 8,648,551 B2 | 2/2014 | Noble |
| 9,209,648 B2 * | 12/2015 | Wheatley ............... H02S 10/40 |
| 9,660,487 B1 * | 5/2017 | Mu .......................... H02J 50/10 |
| 2007/0024246 A1 | 2/2007 | Flaugher |

(Continued)

FOREIGN PATENT DOCUMENTS

| CN | 105857108 | 8/2016 |
| EP | 2883265 | 2/2019 |

OTHER PUBLICATIONS

PCT/US2020/065139—Notification of Transmittal of the International Search Report and the Written Opinion of the International Searching Authority, or the Declaration.

*Primary Examiner* — Alexis B Pacheco
(74) *Attorney, Agent, or Firm* — Neil K. Nydegger, Esq.

(57) ABSTRACT

A transportable unit for charging an electric vehicle has a vehicle docking pad and a source of renewable energy mounted on the docking pad that includes a solar array and/or a wind turbine. Also included is a storage battery for receiving electricity from the source of renewable energy. Structurally, a primary induction coil is affixed to the docking pad where it is connected to receive a converted a.c. current from the storage battery. With this connection, the primary induction coil generates an alternating electromagnetic field that establishes a resonant inductive coupling with a secondary induction coil mounted on the electric vehicle. Thus, an electric current is generated at the secondary induction coil for recharging the battery of the electric vehicle.

19 Claims, 1 Drawing Sheet

(56) References Cited

U.S. PATENT DOCUMENTS

| | | | |
|---|---|---|---|
| 2007/0113921 A1* | 5/2007 | Capizzo | B60L 53/80 141/231 |
| 2007/0246095 A1 | 10/2007 | Schaefer | |
| 2010/0277121 A1* | 11/2010 | Hall | H02J 50/90 320/108 |
| 2011/0133689 A1* | 6/2011 | Uchihashi | H02S 40/38 320/101 |
| 2011/0181240 A1* | 7/2011 | Baarman | H02J 7/00 320/108 |
| 2011/0221203 A1 | 9/2011 | Miller | |
| 2012/0091959 A1* | 4/2012 | Martin | B60L 53/38 320/109 |
| 2013/0127395 A1 | 5/2013 | Santos Silva Serra Duarte | |
| 2013/0314037 A1 | 11/2013 | Caffy | |
| 2013/0342165 A1 | 12/2013 | Brimacombe | |
| 2014/0292264 A1* | 10/2014 | Boys | H01F 5/00 320/108 |
| 2016/0141913 A1 | 5/2016 | Wheatley | |
| 2016/0264007 A1* | 9/2016 | Haase | B60L 53/126 |
| 2017/0001527 A1* | 1/2017 | Prokhorov | B60L 53/36 |
| 2017/0021735 A1 | 1/2017 | Wheatley | |
| 2017/0324896 A1 | 11/2017 | Gharabegian | |
| 2018/0342897 A1* | 11/2018 | Huang | H02J 7/00 |
| 2018/0354383 A1* | 12/2018 | Namou | B60L 53/124 |
| 2019/0061885 A1* | 2/2019 | Baro | B63B 35/44 |
| 2019/0100109 A1* | 4/2019 | Wendeborn | B60L 53/14 |
| 2019/0118657 A1* | 4/2019 | Wang | B60L 53/39 |
| 2019/0225091 A1* | 7/2019 | Wheatley | B60L 53/51 |
| 2019/0381910 A1* | 12/2019 | Akhavan-Tafti | B60L 53/62 |
| 2020/0039367 A1* | 2/2020 | Lyden | B60L 53/31 |
| 2020/0164754 A1* | 5/2020 | Seong | H02J 50/90 |
| 2020/0303968 A1* | 9/2020 | Huang | H02J 50/402 |
| 2020/0307408 A1* | 10/2020 | Oakshott | B60L 53/68 |
| 2021/0155108 A1* | 5/2021 | Martin | B60L 53/54 |
| 2021/0188105 A1* | 6/2021 | Wheatley | B60L 53/122 |
| 2021/0234408 A1* | 7/2021 | Abiri | H02J 50/30 |

\* cited by examiner

SELF-CONTAINED RENEWABLE INDUCTIVE BATTERY CHARGER

FIELD OF THE INVENTION

The present invention pertains generally to charging stations for electric vehicles. More particularly, the present invention pertains to transportable charging stations that incorporate a source of renewable energy which includes both a solar array and a wind turbine. The present invention is particularly, but not exclusively, useful as a transportable charging station that stores electricity from its source of renewable energy for use in establishing a resonant inductive coupling between a primary coil at the charging station and a secondary coil on the electric vehicle for recharging the electric vehicle.

BACKGROUND OF THE INVENTION

Inductive coupling is an electrical phenomenon which is known to have many practical applications. As a phenomenon, inductive coupling occurs whenever a change in current through a first wire induces a voltage across the ends of a second wire. In order to establish inductive coupling, it is necessary to position a portion of the first wire (i.e. a primary coil) in near proximity to a portion of the second wire (i.e. a secondary coil).

In order to use inductive coupling for the specific task of recharging the battery of an electric vehicle, it is necessary to position a secondary coil on the vehicle. It is also necessary to connect the primary coil to a source of electric energy. Heretofore, inductive coupling has been somewhat limited to applications having relatively low power requirements. Thus, primarily due to the relatively high-power requirements for charging the battery of an electric vehicle (e.g. preferably >3 kw), it has been necessary to use a permanently installed source of electric energy, having a substantial power capability (e.g. the "grid").

With the above in mind, there is a demonstrable need for electric vehicle charging stations at locations where, for any of several different reasons, access to the grid is impractical. Also, the present invention appreciates that renewable energy technologies can be transported to local or remote, off-grid locations where they can be effectively operated as self-contained units.

For the reasons set forth above, it is an object of the present invention to provide a transportable unit having a self-contained battery charger for charging electric vehicles. Another object of the present invention is to provide a transportable battery charger having a primary induction coil which establishes a resonant inductive coupling with a secondary induction coil on an electric vehicle for recharging the battery of the electric vehicle. Yet another object of the present invention is to provide a transportable charging station that includes a source of renewable energy for charging the primary induction coil of an inductive coupling circuit, wherein the source of renewable energy includes a solar array and/or a wind turbine. Still another object of the present invention is to provide a transportable battery charger for inductively charging an electric vehicle which is simple to manufacture, is easy to use, and is comparatively cost effective.

SUMMARY OF THE INVENTION

A transportable unit for charging the battery of an electric vehicle includes a moveable docking pad with an access ramp for parking electric vehicles on the docking pad. Also included is a source of renewable energy that is incorporated for transport with the unit. A primary induction coil is affixed to the docking pad, and electric circuitry is provided on the unit for connecting the primary induction coil with the source of renewable energy. A secondary induction coil is positioned on an electric vehicle so that, when the electric vehicle is parked on the docking pad, a resonant inductive coupling is established for recharging the battery of the electric vehicle.

For purposes of the present invention, the source of renewable energy will typically include a solar array and/or a wind turbine. This source of renewable energy is directly connected with a storage battery which is located on the transportable unit. Thus, the storage battery receives electricity that is generated both by the solar array, and by the wind turbine. In sequence, an inverter is connected to the storage battery, for converting a d.c. current from the storage battery into an a.c. current that can be used for an operation of the primary induction coil.

Also included in the electric circuitry of the present invention is a current control unit. Specifically, the current control unit is located with the circuitry, between the inverter and the primary induction coil. Important functions of the current control unit are to establish the frequency of the a.c. current that is delivered to the primary induction coil, and to regulate the power level of this current. As intended for the present invention, the power level for recharging an electric vehicle will be greater than 3 kw. The current control unit can also function as an ON/OFF switch for the primary induction coil.

For an operation of the present invention, a column is provided as part of the transportable unit, and this column includes a platform for supporting the source of renewable energy. In this combination, the column is used to selectively position the source of renewable energy by reconfiguring the column between a collapsed configuration for transportation of the source of renewable energy, and a vertical orientation wherein the source of renewable energy is operable for generating electric energy. It is an important feature of the present invention that, when the column is in its vertical orientation, the source of renewable energy is positioned at a predetermined distance above the docking pad. The purpose here is two-fold. For one, this predetermined distance must allow for the parking of a vehicle on the docking pad. For another, the vertical orientation provides for a safe operational position of the source of renewable energy that minimizes the footprint of the transportable unit.

Additional features of the transportable unit include a motor for rotating the solar panel in accordance with a predetermined protocol. Specifically, this protocol is intended to optimize an incidence of sunlight on the solar panel. Further, the transportable unit preferably includes a support structure that is secured to the platform for holding and maintaining the wind turbine in a down-sun position relative to the solar panel. It is envisioned that this support structure will also distance the wind turbine from the solar panel, and thereby avoid interference from the solar panel with the wind that is driving the wind turbine or shading of the solar panel(s) by the wind turbine.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
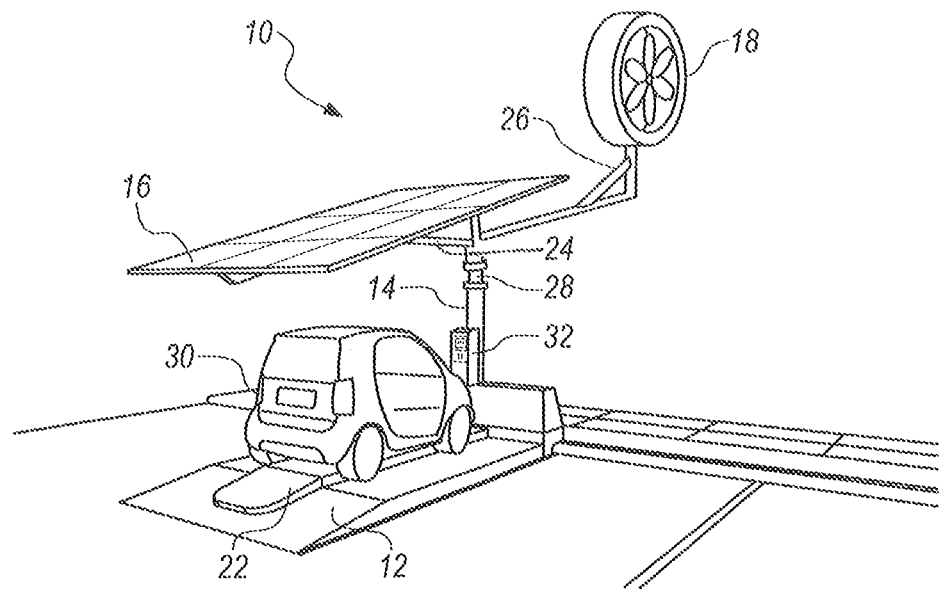
FIG. 1 is a perspective view of the transportable unit for charging an electric vehicle in accordance with the present invention.

Referring initially to FIG. 1, a transportable unit in accordance with the present invention is shown and is generally designated 10. As shown, the unit 10 includes a moveable docking pad 12, with a column 14 that is mounted on the docking pad 12. It is also shown that the unit 10 includes a solar array 16 and a wind turbine 18. Together, the solar array 16 and the wind turbine 18 constitute a source of renewable energy 20 (see FIG. 2) for use by the transportable unit 10. It is also an important aspect of the present invention that the wind turbine 18 is held in a down-sun position, relative to the solar array 16, so that the solar array 16 does not interfere with the wind turbine 18, and vice versa.

FIG. 1 also shows that a storage battery 22 is positioned on the docking pad 12. Further, FIG. 1 shows that a platform 24 for holding the source of renewable energy 20 is mounted on the column 14. Also, a support structure 26 is provided with the platform 24 for supporting the wind turbine 18 on the support structure 26. It is also shown in FIG. 1 that a motor 28 is positioned on the column 14 for rotating the platform 24, along with the source of renewable energy 20, through a horizontal arc. As will be appreciated by the skilled artisan, the rotational velocity for position and orientation of the platform 24 will depend on the incidence angle of sunlight on the solar array 16. Thus, the inclination of the solar array 16 will also be dependent on both the time of day and the latitude of the transportable unit 10.

Still referring to FIG. 1, an electric vehicle 30 is shown positioned on the docking pad 12 of the transportable unit 10. As shown, the electric vehicle 30 is positioned for a recharging operation in accordance with the present invention, the control of a recharging operation will be provided by a charging station 32, which is incorporated into the transportable unit 10.

With the structure for a transportable unit 10 as disclosed above, it is an important feature of the present invention that the transportable unit 10 be reconfigurable between an operational configuration (i.e. FIG. 1), and a configuration that is convenient for transport. For this purpose, the transition between operational and transport configuration is preferably accomplished in a manner similar to that disclosed in U.S. Pat. No. 9,917,471 which issued to Wheatley, and which is assigned to the same assignee as the present invention.

Figure 2:
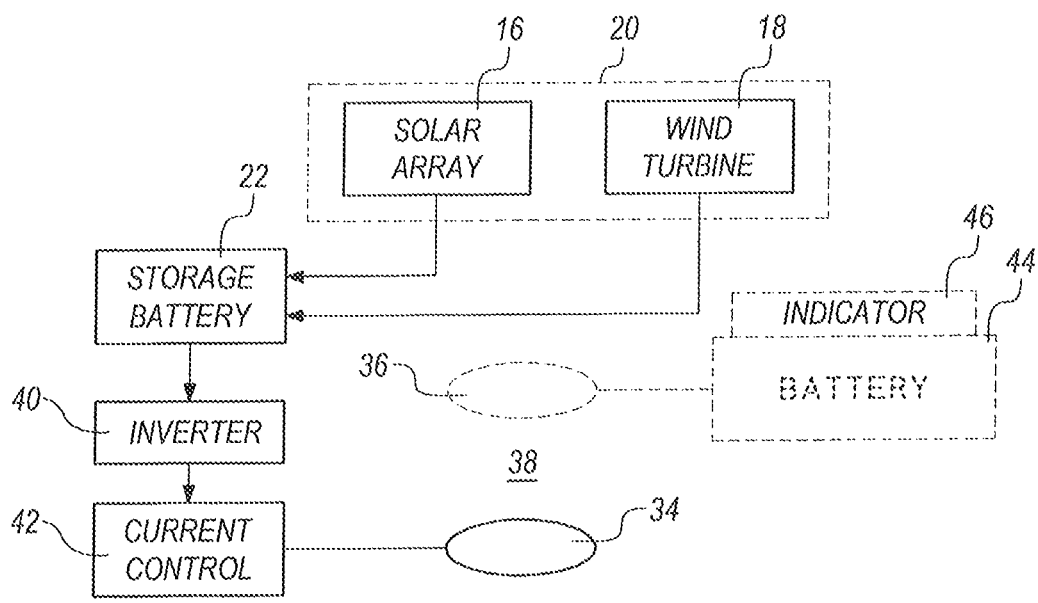
FIG. 2 is a schematic presentation of the electronic circuitry required for operation the transportable unit of the present invention.

For an operation of the present invention, the schematic presentation of FIG. 2 is provided for showing the electrical components that interact with each other for the purpose of recharging the electric vehicle 30. As shown, these components include a primary induction coil 34 which is positioned on the docking pad 12 of the transportable unit 10, and a secondary induction coil 36 which is installed on the electric vehicle 30. Thus, when the electric vehicle 30 is driven onto the docking pad 12, and is parked as shown in FIG. 1, the secondary induction coil 36 on the electric vehicle 30 is properly positioned relative to the primary induction coil 34 on the docking pad 12. Specifically, with the electric vehicle 30 positioned as shown, a resonant inductive coupling 38 can be established between the primary induction coil 34 and the secondary induction coil 36 for recharging the electric vehicle 30.

As intended for the present invention, the resonant inductive coupling 38 is established via an electromagnetic field which is generated by the primary induction coil 34 with an a.c. electric current from the storage battery 22. In detail, an inverter 40 is provided to convert a d.c. current from the storage battery 22 into the a.c. current. Further, a current control 42 is electrically connected with the inverter 40, to establish a frequency and a current level for the a.c. current. The a.c. current then drives the primary induction coil 34 to generate an alternating electromagnetic field.

For purposes of the present invention, the alternating electromagnetic field that is generated by the primary induction coil 34 will have a predetermined power level that is capable of recharging a battery 44 of the electric vehicle 30. Preferably, the power level for charging the battery 44 will be greater than 3 kw. FIG. 2 also shows that an indicator 46 can be installed with the electric vehicle 30 for the purpose of displaying the charging status of the battery 44 during a recharging operation.

While the particular Self-Contained Renewable Inductive Battery Charger as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A transportable unit for providing a self-contained inductive battery charger for charging an electric vehicle which comprises:

a moveable docking pad transportable to an off-grid location with an access ramp for parking the electric vehicle on the docking pad;

a source of renewable energy incorporated with the docking pad;

a storage battery located with the docking pad and connected with the source of renewable energy for receiving electricity therefrom;

a primary induction coil affixed to the docking pad, wherein the primary induction coil is connected with the source of renewable energy via the storage battery to receive an electric current therefrom for generating an alternating electromagnetic field;

an inverter connected between the storage battery and the primary induction coil for converting a d.c. current from the storage battery into an a.c. current for use by the primary induction coil to generate an alternating electromagnetic field;

a current control unit in the inverter for varying the frequency of the a.c. current from the inverter to control the alternating electromagnetic field; and a secondary induction coil affixed to the electric vehicle in contact with the battery of the electric vehicle wherein, with the electric vehicle properly positioned and parked on the docking pad the electromagnetic field of the primary induction coil is positioned to establish a resonant inductive coupling with the secondary induction coil for recharging the battery of the electric vehicle.

2. The transportable unit of claim 1 further comprising:
a column mounted on the docking pad for transport therewith, wherein the column is moveable between a collapsed configuration for transporting the source of renewable energy, and a vertical orientation for operating the source of renewable energy; and
a platform for supporting the source of renewable energy, wherein the platform is connected with the column and is positioned at a predetermined distance above the docking pad when the column has been moved into its vertical configuration.

3. The transportable unit of claim 2 wherein the source of renewable energy comprises:
a solar panel mounted on the platform for harnessing solar energy;
a wind turbine mounted on the platform for harnessing wind energy; and
a circuitry provided on the transportable unit for electrically connecting the solar panel and the wind turbine with the storage battery for simultaneously transferring electricity from the solar panel and from the wind turbine to the storage battery.

4. The transportable unit of claim 3 further comprising:
a motor for reorienting the solar panel in accordance with a predetermined protocol to optimize an incidence of sunlight on the solar panel; and
a support structure secured to the platform for holding and maintaining the wind turbine in a down-sun position relative to the solar panel, and for distancing the wind turbine from the solar panel to avoid interference from the solar panel with wind driving the wind turbine and shading of the solar panel.

5. The transportable unit of claim 1 wherein the current control unit sets a value for the a.c. current to establish the resonant inductive coupling between the primary induction coil and the secondary induction coil.

6. The transportable unit of claim 1 further comprising a charging indicator connected with the secondary induction coil and a battery in the electric vehicle to provide a visual indication of the electric charge received from the storage battery on the transportable unit.

7. The transportable unit of claim 1 wherein the primary induction coil delivers a.c. current to the secondary induction coil with a power greater than 3 kw.

8. A charging station having an inductive battery charger for an electric vehicle which comprises:
a transportable docking pad transportable to an off-grid location with an access ramp for parking the electric vehicle on the docking pad;
a primary induction coil affixed to the docking pad;
at least one source of renewable energy connected to the primary coil and structurally incorporated with the docking pad at a predetermined distance above the docking pad for positioning the electric vehicle between the source of renewable energy and the primary coil on the docking pad;
a storage battery located with the docking pad and connected with the source of renewable energy for receiving electricity therefrom;
an inverter connected between the storage battery and the primary induction coil for converting a d.c. current from the storage battery into an a.c. current for use by the primary induction coil to generate an alternating electromagnetic field with the primary induction coil;
a current control unit in the inverter for varying the frequency of the a.c. current from the inverter to control the electromagnetic field of the primary induction coil; and
a secondary induction coil mounted on the electric vehicle wherein, with the electric vehicle properly positioned and parked on the docking pad the electromagnetic field of the primary induction coil establishes a resonant inductive coupling with the secondary induction coil for recharging a battery of the electric vehicle.

9. The charging station of claim 8 wherein the current control unit sets a value for the a.c. current to establish the resonant inductive coupling between the primary induction coil and the secondary induction coil.

10. The charging station of claim 9 wherein the primary induction coil delivers a.c. current to the secondary induction coil with a power greater than 3 kw.

11. A method for manufacturing a transportable unit for providing a transportable self-contained inductive battery charger for charging an electric vehicle at an off-grid location which comprises the steps of:
providing a moveable docking pad transportable to an off-grid location with an access ramp for parking the electric vehicle on the docking pad;
affixing a primary induction coil to the docking pad;
affixing a secondary induction coil on the electric vehicle in contact with the battery of the electric vehicle;
positioning a storage battery on the transportable unit;
connecting at least one source of renewable energy with the storage battery, wherein the source of renewable energy is incorporated with the docking pad;
connecting the storage battery with the primary induction coil for converting a d.c. current from the storage battery into an a.c. current for use by the primary induction coil;
mounting a column on the docking pad for transport therewith, wherein the column is moveable between a collapsed configuration for transporting the source of renewable energy, and a vertical orientation for operating the source of renewable energy; and
installing electrical circuitry on the transportable unit for connecting the source of renewable energy with the storage battery for transferring electricity therefrom for a subsequent use of the electricity by the primary induction coil to generate an alternating electromagnetic field, and establish a resonant inductive coupling with a secondary induction coil on the electric vehicle wherein, with the electric vehicle properly positioned and parked on the docking pad, the electromagnetic field of the primary induction coil is positioned to establish a resonant inductive coupling with the secondary induction coil for recharging the battery of the electric vehicle.

12. The method of claim 11 wherein the source of renewable energy: is selected from the group consisting of a solar panel mounted on a platform for harnessing solar energy; and a wind turbine mounted on a platform for harnessing wind energy.

13. The method of claim 12 further comprising the steps of:
rotating the solar panel in accordance with a predetermined protocol to optimize an incidence of sunlight on the solar panel; and
a support structure secured to the platform for holding and maintaining the wind turbine in a down-sun position relative to the solar panel, and for distancing the wind turbine from the solar panel to avoid interference from the solar panel with wind driving the wind turbine and shading of the solar panel by the turbine.

14. The method of claim 13 further comprising the step of connecting an inverter between the storage battery and the primary induction coil for converting a d.c. current from the storage battery into an a.c. current for use by the primary induction coil.

15. The method of claim 14 further comprising the step of providing a current control unit with the inverter for varying the frequency of the a.c. current from the inverter, wherein the current control unit sets a value for the a.c. current to establish the resonant inductive coupling between the primary induction coil and the secondary induction coil.

16. The method of claim 15 wherein the primary induction coil delivers a.c. current to the secondary induction coil with a power greater than 3 kw.

17. The transportable unit of claim 1 wherein the source of renewable energy is selected from the group consisting of a wind turbine and a solar panel.

18. The charging station of claim 8 wherein the source of renewable energy is selected from the group consisting of a wind turbine and a solar panel.

19. The method of claim 11 wherein the source of renewable energy is selected from the group consisting of a wind turbine and a solar panel.

\* \* \* \* \*